(12) United States Patent
Peng

(10) Patent No.: US 12,055,807 B2
(45) Date of Patent: Aug. 6, 2024

(54) LIQUID CRYSTAL DISPLAY PANEL AND DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Meifa Peng, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/618,482

(22) PCT Filed: Nov. 25, 2021

(86) PCT No.: PCT/CN2021/133015
§ 371 (c)(1),
(2) Date: Dec. 12, 2021

(87) PCT Pub. No.: WO2023/082342
PCT Pub. Date: May 19, 2023

(65) Prior Publication Data
US 2024/0012275 A1  Jan. 11, 2024

(30) Foreign Application Priority Data
Nov. 15, 2021 (CN) .......................... 202111345266.6

(51) Int. Cl.
*G02F 1/1333* (2006.01)
*G02F 1/1335* (2006.01)

(52) U.S. Cl.
CPC .. *G02F 1/133337* (2021.01); *G02F 1/133514* (2013.01); *G02F 2201/501* (2013.01)

(58) Field of Classification Search
CPC ......... G02F 1/136254; G02F 1/133337; G02F 1/133514; G02F 2201/501; G09G 3/006
See application file for complete search history.

(56) References Cited

U.S. PATENT DOCUMENTS

2004/0183084 A1 * 9/2004 Wachi ............... G02F 1/133555
257/98
2013/0021541 A1 * 1/2013 Ito ..................... G02F 1/133524
349/5

(Continued)

FOREIGN PATENT DOCUMENTS

CN    105759526 A  *  7/2016
CN    105759526 A      7/2016

(Continued)

OTHER PUBLICATIONS

English translation for CN-105759526-A, Xiong (Year: 2016).*

(Continued)

*Primary Examiner* — Jonathan Y Jung
(74) *Attorney, Agent, or Firm* — PV IP PC; Wei Te Chung; Zhigang Ma

(57) ABSTRACT

Embodiment of the present application provide a liquid crystal display panel and a display device. In the liquid crystal display panel provided by the embodiments of the present application, by providing a protection film covering the edge area of the top surface of the color resist block in the test area of the first substrate, the phenomenon that the ions in the color resist block diffuse into the liquid crystal layer caused by the damage or missing of the second passivation layer can be prevented, thus solving the technical problem of blackening of the edge area of the liquid (Continued)

crystal display panel, and improving the display quality of the liquid crystal display panel.

19 Claims, 3 Drawing Sheets

(56) References Cited

U.S. PATENT DOCUMENTS

| | | | |
|---|---|---|---|
| 2014/0022478 | A1 | 1/2014 | Kim et al. |
| 2017/0085865 | A1* | 3/2017 | Sumi ............... H04N 13/305 |
| 2017/0199431 | A1 | 7/2017 | Kim et al. |
| 2019/0331949 | A1* | 10/2019 | Veidhes ............ G02F 1/133723 |
| 2022/0100025 | A1* | 3/2022 | Nishida ............ G02F 1/133388 |

FOREIGN PATENT DOCUMENTS

| | | | | |
|---|---|---|---|---|
| CN | 205844685 | U | | 12/2016 |
| CN | 109116617 | A | | 1/2019 |
| CN | 110850629 | A | | 2/2020 |
| CN | 111338143 | A | * | 6/2020 ....... G02F 1/133345 |
| CN | 111338143 | A | | 6/2020 |
| CN | 210720945 | U | | 6/2020 |
| CN | 112305807 | A | | 2/2021 |
| EP | 0338412 | A2 | | 10/1989 |
| JP | H07198924 | A | | 8/1995 |
| JP | H07281197 | A | | 10/1995 |
| KR | 20070065065 | A | | 6/2007 |

OTHER PUBLICATIONS

English translation for CN-111338143-A, Zhao H (Year: 2020).*
Chinese Office Action issued in corresponding Chinese Patent Application No. 202111345266.6 dated Jun. 10, 2022, pp. 1-7.
International Search Report in International application No. PCT/CN2021/133015, mailed on Jun. 24, 2022.
Written Opinion of the International Searching Authority in International application No. PCT/CN2021/133015, mailed on Jun. 24, 2022.
Chinese Office Action issued in corresponding Chinese Patent Application No. 202111345266.6 dated Nov. 28, 2022, pp. 1-4.
Chinese Decision of Rejection issued in corresponding Chinese Patent Application No. 202111345266.6 dated Mar. 24, 2023, pp. 1-7.

* cited by examiner

LIQUID CRYSTAL DISPLAY PANEL AND DISPLAY DEVICE

BACKGROUND OF INVENTION

Field of Invention

The present application relates to a field of display technology, and in particular to a liquid crystal display panel and a display device.

Description of Prior Art

With development of display technology, liquid crystal displays (LCDs) have been widely used in various consumer electronic products such as mobile phones, TVs, personal digital assistants, digital cameras, notebook computers, and desktop computers, and have become the mainstream of display devices.

Most of the liquid crystal display devices currently on the market are backlit liquid crystal displays, which include a liquid crystal display panel and a backlight module.

At present, in industry of the liquid crystal display panels, reliability verification of the liquid crystal display panels is usually carried out before shipment. The reliability verification includes the heating experiment of the liquid crystal display panel. After heating, when a display effect of the liquid crystal display panel is tested, blackening (as shown in FIG. 1) is often found at an edge area of the liquid crystal display panel.

SUMMARY OF INVENTION

After research, the inventor(s) of the present application discovered that a reason for blackening on the liquid crystal display panel is that a second passivation layer disposed on an edge area of a color resist block in a test color resist layer is prone to damage or missing due to manufacturing processes. In a position where the second passivation layer is damaged or missing (an edge area of the color resist block), since the color resist block lacks protection provided by the second passivation layer, ions (such as bromide ion, and so on) in the color resist block are easy to penetrate into the liquid crystal layer, causing contamination to the liquid crystal material. When the liquid crystal material is contaminated, its deflection performance is impacted and normal deflection cannot proceed. Therefore, when the liquid crystal display panel displays a picture, the edge area is prone to blackening.

Embodiments of the present application provide a liquid crystal display panel and a display device. The edge area of the liquid crystal display panel does not blacken, and has better display quality.

In a first aspect, an embodiment of the present application provides a liquid crystal display panel, including:
 a first substrate;
 a second substrate disposed opposite to the first substrate; and
 a liquid crystal layer disposed between the first substrate and the second substrate;
 wherein the first substrate includes a first base substrate, a TFT layer, a first passivation layer, a color photoresist layer, and a second passivation layer stacked in sequence;
 wherein the first substrate is defined with a display area and a test area defined at a periphery of the display area, and the color photoresist layer includes a color filter layer disposed in the display area and a test color resist layer disposed in the test area; and
 wherein a second passivation layer and a protection film are sequentially stacked on a side of the test color resist layer away from the first substrate, the test color resist layer includes a plurality of color resist blocks, and the protection film covers at least edge areas of top surfaces of the plurality of color resist blocks.

In some embodiments, the first substrate further includes a pixel electrode layer, and the pixel electrode layer is disposed on a side of the second passivation layer away from the color photoresist layer; and
 wherein the pixel electrode layer includes a pixel electrode disposed in the display area and the protection film disposed in the test area, and the pixel electrode is not connected to the protection film.

In some embodiments, a width of each of the edge areas extending inward from an edge of one of the color resist blocks is ⅒ to ½ of a width of the one of the color resist blocks in a same direction.

In some embodiments, the protection film includes a plurality of protection units; in the test color resist layer, a gap area between every two adjacent ones of the color resist blocks is provided with one of the protection units, and the protection unit covers the gap area between the two adjacent ones of the color resist blocks and covers the edge areas of the two adjacent ones of the color resist blocks respectively facing the gap area.

In some embodiments, a material of the protection film includes a transparent conductive metal oxide.

In some embodiments, the transparent conductive metal oxide includes indium tin oxide.

In some embodiments, a material of the protection film includes an organic polymer material.

In some embodiments, the protection film has a thickness of 10 nm to 500 nm.

In some embodiments, the protection film has a shape of a rectangle, an ellipse, a circle, or a rhombus.

In some embodiments, an edge of the protection film is jagged or straight.

In some embodiments, an extending direction of the protection film and an arrangement direction of the plurality of color resist blocks are perpendicular to each other.

In some embodiments, an angle between an extending direction of the protection film and an arrangement direction of the plurality of color resist blocks is 45°, 60°, 70°, or 80°.

In some embodiments, a material of the first passivation layer includes at least one of silicon nitride and silicon oxide, and a material of the second passivation layer includes nitride includes at least one of silicon and silicon oxide.

In some embodiments, the second substrate includes a second base substrate and a black matrix disposed on the second base substrate.

In some embodiments, each of the first base substrate and the second base substrate is a light-transmitting substrate.

In some embodiments, the first base substrate is a glass substrate or a plastic substrate, and the second base substrate is a glass substrate or a plastic substrate.

In some embodiments, the liquid crystal display panel further includes a sealant arranged between the first substrate and the second substrate and at a periphery of the liquid crystal layer.

In some embodiments, each of the display area and the test area is disposed at an inner side of the sealant.

In some embodiments, a plurality of spacers are disposed between the first substrate and the second substrate.

In a second aspect, an embodiment of the present application provides a display device, including the above-mentioned liquid crystal display panel and a backlight module disposed on a light incident side of the liquid crystal display panel.

In the liquid crystal display panel provided by the embodiments of the present application, by providing a protection film covering the edge area of the top surface of the color resist block in the test area of the first substrate, the phenomenon that the ions in the color resist block diffuse into the liquid crystal layer caused by the damage or missing of the second passivation layer can be prevented, thus solving the technical problem of blackening of the edge area of the liquid crystal display panel, and improving the display quality of the liquid crystal display panel.

BRIEF DESCRIPTION OF DRAWINGS

In order to more clearly illustrate the technical solutions of the embodiments of the present application, the drawings illustrating the embodiments will be briefly described below. Obviously, the drawings in the following description merely illustrate some embodiments of the present invention. Other drawings may also be obtained by those skilled in the art according to these figures without paying creative work.

In order to have a more complete understanding of the present application and its beneficial effects, the description will be given below in conjunction with the accompanying drawings. The same reference numerals in the following description indicate the same elements.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

Figure 1:
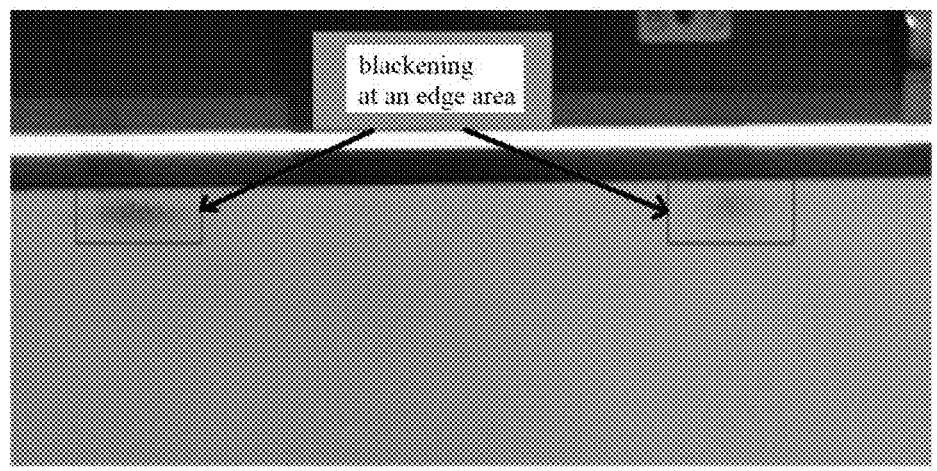
FIG. 1 is a schematic diagram of a situation where blackening appears an edge area of a conventional liquid crystal display panel.
Figure 2:
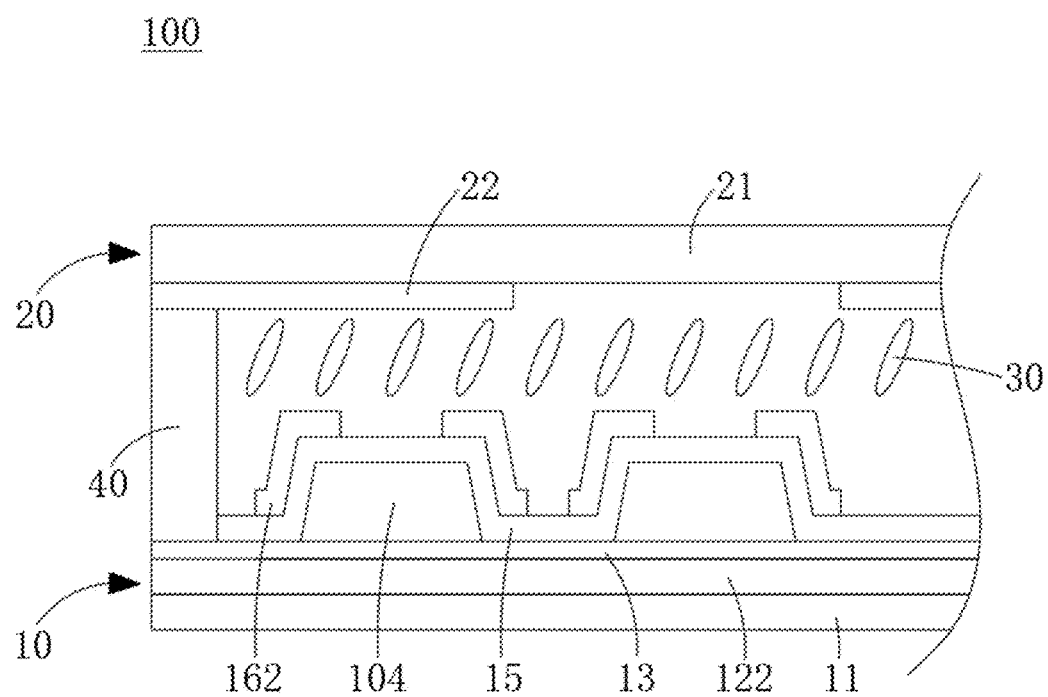
FIG. 2 is a schematic structural diagram of a liquid crystal display panel provided by an embodiment of the present application.
Figure 3:
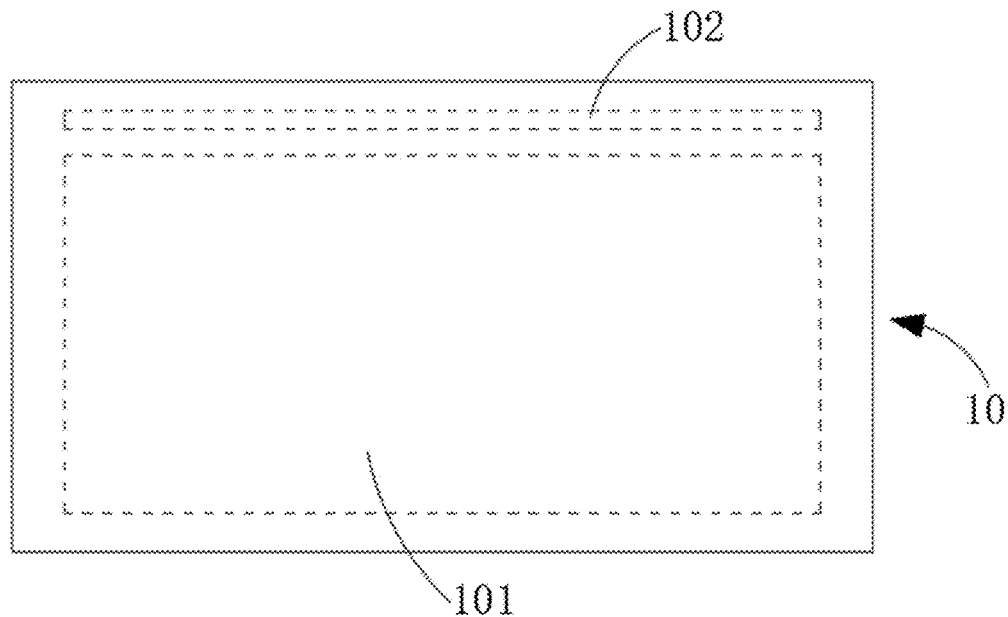
FIG. 3 is a schematic top view of a first substrate provided by an embodiment of the present application.
Figure 4:
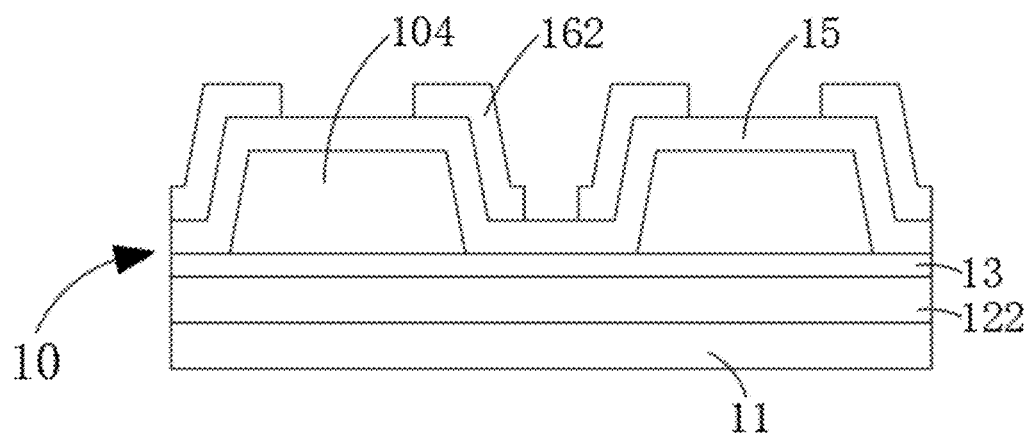
FIG. 4 is a schematic cross-sectional view of a test area of a first substrate provided by an embodiment of the present application.

Referring to FIGS. 2 to 4, FIG. 2 is a schematic structural diagram of a liquid crystal display panel provided by an embodiment of the present application, FIG. 3 is a schematic top view of a first substrate provided by an embodiment of the present application, and FIG. 4 is a schematic cross-sectional view of a test area of a first substrate provided by an embodiment of the present application. An embodiment of the present application provides a liquid crystal display panel 100, which includes a first substrate 10, a second substrate 20, and a liquid crystal layer 30. The second substrate 20 is disposed opposite to the first substrate 10, and the liquid crystal layer 30 is disposed between the first substrate 10 and the second substrate 20.

The first substrate 10 includes a first base substrate 11, a thin-film transistor (TFT) layer, a first passivation layer 13, a color photoresist layer, and a second passivation layer 15 which are stacked in sequence; the first substrate 10 is defined with a display area 101 and a test area 102 defined at a periphery of the display area 101, and the color photoresist layer 142 includes a color filter layer disposed in the display area 101 and a test color resist layer 142 disposed in the test area 102; a second passivation layer 15 and a protection film 162 are sequentially stacked on a side of the test color resist layer 142 away from the first substrate 10, the test color resist layer 142 includes a plurality of color resist blocks 104, and the protection film 162 covers at least edge areas of top surfaces of the plurality of color resist blocks 104.

It should be noted that, in an embodiment of the present application, the display area 101 of the first substrate 10 is usually arranged in a middle position of the first substrate 10 and occupies a relatively large area. Various films and devices, including TFT devices, color filter layers, and so on for realizing picture display can be deposited in the display area 101. The test area 102 of the first substrate 10 is usually defined at the edge area of the first substrate 10, located at the side of the display area 101, and occupies a relatively small area. During a process of preparing the first substrate 10, when a certain layer is deposited in the display area 101, if the performance and parameters of the layer need to be tested later, the same layer can also be deposited in the test area 102 at the same time. When a via hole is formed in the display area 101, if the performance and parameters of the via hole need to be tested later, the same via hole can also be formed in the test area 102 at the same time. When the above-mentioned layer and/or the via hole in the display area 101 needs to be tested subsequently, the performance parameters and data of the above-mentioned layer and/or the via hole in the display area 101 can be obtained by directly detecting the corresponding layer and/or via hole in the test area 102, preventing a damage that may be caused when directly testing the layer and/or the via hole in the display area 101, and effectively protecting the layer and devices in the display area 101. Moreover, since the test area 102 is defined at the edge of the first substrate 10, the detection process can be carried out more convenient and faster.

Referring to FIGS. 2 and 4, it is appreciated that the top surface of the color resist block 104 refers to a surface of the color resist block 104 on a side away from the first substrate 10.

It should be noted that the "edge area" can be a part of the edge of the color resist block 104, or all of the edge of the color resist block 104. For example, when the color resist block 104 has four sides, "the edge of the color resist block 104" can refer to one side, two sides, three sides, or four sides of the color resist block 104.

Regarding a width of the "edge area", in a direction perpendicular to the covered edge, the width of the "edge area" extending inward from the edge of the color resist block 104 may be 1/10 to 1/2 of the width of the color resist block 104 in a same direction, such as 1/10, 1/9, 1/8, 1/7, 1/6, 1/5, 1/4, 1/3, 1/2, 3/10, 2/9, 4/9, 3/8, 2/7, 3/7, 2/5, etc.

It is appreciated that because only the edge area of the top surface of the color resist block 104 is prone to damage or missing of the second passivation layer 15, the problem can be solved by disposing the protection film 162 to cover only the edge area of the top surface of the color resist block 104. However, from a perspective of simplifying the manufacturing process, the protection film 162 can also be made to have a larger area, that is, the protection film 162 can cover other areas except the edge area. For example, in some embodiments, the protection film 162 is also possible to cover an entire area of the top surface of the plurality of color resist blocks 104.

It is appreciated that the test color resist layer 142 can be substantially the same as the color filter layer located in the display area 101 in terms of material, shape, size, etc. Therefore, various parameters of the color filter layer can be obtained by testing the test color resist layer 142 located in the test area 102, so that the color filter layer can be prevented from being damaged by directly testing the color filter layer located in the display area 101.

In the liquid crystal display panel 100 provided by the embodiments of the present application, by providing a protection film 162 covering the edge area of the top surface of the color resist block 104 in the test area 102 of the first substrate 10, the phenomenon that the ions in the color resist block 104 diffuse into the liquid crystal layer 30 caused by the damage or missing of the second passivation layer 15 can be prevented, thus solving the technical problem of blackening of the edge area of the liquid crystal display panel 100, and improving the display quality of the liquid crystal display panel 100.

In the embodiments of the present application, the term "plurality" refers to a number of two or more than two, such as three, four, five, six, seven, eight, nine, ten, etc.

Referring to FIG. 4, the first substrate 10 may also include a pixel electrode layer, and the pixel electrode layer is disposed on a side of the second passivation layer 15 away from the color photoresist layer; the pixel electrode layer includes a pixel electrode located in the display area 101 and a protection film 162 located in the test area 102, wherein the pixel electrode and the protection film 162 are not connected to each other. In other words, the protection film 162 is a part of the pixel electrode layer, and the pixel electrode and the protection film 162 are manufactured in the same manufacturing process.

It is appreciated that the two structures, i.e., the pixel electrode and the protection film 162, are prepared by one manufacturing process. Since the manufacturing process of the pixel electrode layer is a part of the original process, although the protection film 162 is added to the first substrate 10 in the embodiment of the application, the manufacturing process of first substrate 10 is not changed, and the production cost and process time are not increased.

Exemplarily, the TFT layer may also include a TFT device layer located in the display area 101 and a TFT test layer 122 located in the test area 102. It is appreciated that the structures of the various layers in the TFT device layer and the TFT test layer 122 are basically the same. Therefore, various parameters of the TFT device layer can be obtained by testing the TFT test layer 122 located in the test area 102, so as to prevent the TFT device being damaged by directly testing the TFT device layer located in the display area 101.

Figure 5:
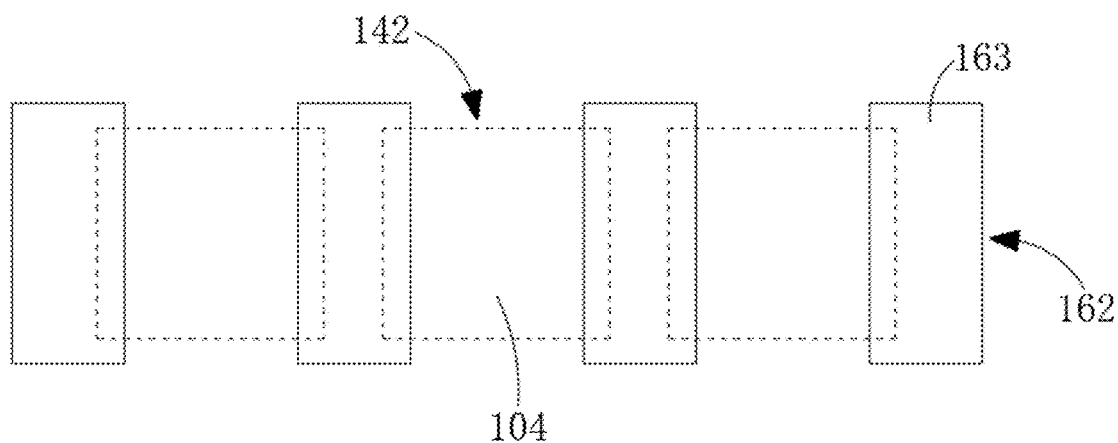
FIG. 5 is a schematic top view of a test color resist layer and a protection film in a first substrate provided by an embodiment of the present application.

Referring to FIG. 5, FIG. 5 is a schematic top view of the test color resist layer 142 and the protection film in the first substrate provided by an embodiment of the present application. The protection film 162 may include a plurality of protection units 163. In the test color resist layer 142, a gap area between every two adjacent ones of the color resist blocks 104 is provided with one of the protection units 163, and the protection unit 163 covers the gap area between the two adjacent ones of the color resist blocks 104 and covers the edge areas of the two adjacent ones of the color resist blocks 104 respectively facing the gap area.

It should be noted that the inventor(s) of the present application found in experiments that among the plurality of color resist blocks 104 of the test color resist layer 142, the adjacent edge areas on adjacent ones of the color resist blocks 104 are prone to missing or damage of the second passivation layer 15, and the two sides (respectively a side facing the display area 101 and a side away from the display area 101) of the color resist block 104 that are not adjacent to other color resist blocks 104 are not prone to missing or damage of the second passivation layer 15. Therefore, in an actual solution, the problem can be solved by protecting only the edge areas on opposite sides of the color resist 104 close to the gap area. In addition, from the perspective of ensuring electrical performance of the liquid crystal display panel 100, an area of the protection film 162 should not be too large, because there is a voltage difference between the protection film 162 and the pixel electrode located in the display area 101, which is equivalent to forming a lateral capacitance between the pixel electrode and the protection film 162. Therefore, when the area of the protection film 162 is too large, a voltage on the pixel electrode will be impacted, and the electrical performance of the liquid crystal display panel 100 will be unstable. As such, in an embodiment of the present application, the protection unit 163 in the protection film 162 is designed to cover only the edge area of the color resist block 104 adjacent to another color resist block 104, which can minimize the area of the protection unit 163 and reduce the influence of the protection film 162 on the voltage of the pixel electrode.

It is appreciated that, when a plurality of color resist blocks 104 are arranged in a row in the test color resist layer 142, each of outer edges of two of the color resist blocks 104 located at opposite ends may also be provided with the protection unit 163.

Exemplarily, a shape of the protection unit 163 may be a rectangle.

Exemplarily, a material of the pixel electrode layer may include a transparent conductive metal oxide. That is, materials of the pixel electrode and the protection film 162 can be both transparent conductive metal oxide. It should be noted that since a layer formed by deposition of the transparent conductive metal oxide is relatively dense, it can provide a better protection for the top surface of the color resist block 104, and the protection film 162 can be prepared in the same process as the pixel electrode, so that there is no need to increase production cost and process time, and performance of the liquid crystal display panel 100 is improved without changing the original process.

It should be noted that the transparent conductive metal oxide may be one or more of indium tin oxide, zinc aluminum oxide, tin fluorine oxide, zinc gallium oxide, and zinc tin oxide.

In some embodiments, the transparent conductive metal oxide may be indium tin oxide.

Exemplarily, the material of the protection film 162 may also be an organic polymer material, such as polyimide (PI). It is appreciated that due to the denser structure of the organic polymer material, the top surface of the color resist block 104 can be better protected, and the phenomenon of blackening of the edge area of the liquid crystal display panel 30 caused by the ions in the color resist block 104 diffusing into the liquid crystal layer 30 can be prevented.

Exemplarily, a thickness of the protection film 162 is 10 nm to 500 nm, such as 10 nm, 20 nm, 50 nm, 100 nm, 200 nm, 300 nm, 400 nm, 500 nm, and so on.

Exemplarily, the protection film 162 has a shape of a rectangle, an ellipse, a circle, a rhombus, an irregular shape, or the like.

Exemplarily, an edge of the protection film is jagged, straight, or the like.

Exemplarily, an extending direction of the protection film 162 and an arrangement direction of the plurality of color resist blocks 104 are perpendicular to each other, or in a non-perpendicular relationship. For example, an angle between the extending direction of the protection film 162 and the arrangement direction of the plurality of color resist blocks 104 can be 45°, 60°, 70°, 80°, and so on.

Exemplarily, a material of the first passivation layer 13 may include at least one of silicon nitride (SiOx) and silicon oxide (SiNx). A material of the second passivation layer 15 may include at least one of silicon nitride and silicon oxide.

Referring to FIG. 2, the second substrate 20 may include a second base substrate 21 and a black matrix 22 provided on the second base substrate 21.

It is appreciated that the color filter layer located in the display area 101 may also include a plurality of color resist blocks arranged at intervals, and the black matrixes 22 are used to shield the gap areas between the plurality of color resist blocks to prevent interference caused by light leakage between pixels, thus improving the display effect.

It is appreciated that each of the first base substrate 11 and the second base substrate 21 is a light-transmitting substrate, and light transmittance of the light-transmitting substrate may be greater than 50%, such as 50%, 55%, 60%, 65%, 70%, 75%, 80%, 90%, 95%, 100%, etc.

Exemplarily, the first base substrate 11 may be a glass substrate or a plastic substrate, and the second base substrate 21 may be a glass substrate or a plastic substrate.

In some embodiments of the present application, the first base substrate 11 and the second base substrate 21 may both be glass substrates.

Referring to FIG. 2, the liquid crystal display panel 100 may further include a sealant 40 arranged between the first substrate 10 and the second substrate 20 and arranged at a periphery of the liquid crystal layer 30.

It is appreciated that the sealant 40 is used to cooperate with the first substrate 10 and the second substrate 20 to enclose a sealed space for accommodating the liquid crystal material. Exemplarily, the overall structure of the sealant 40 may have a rectangular shape or other shapes.

Exemplarily, each of the display area 101 and the test area 102 is disposed at an inner side of the sealant 40.

Exemplarily, a plurality of spacers may be provided between the first substrate 10 and the second substrate 20. The spacers may define a thickness of the liquid crystal layer 30. When the liquid crystal display panel 100 is pressed by an external force, the spacers may support the first substrate 10 and the second substrate 20 to ensure that the thickness of the liquid crystal cell remains unchanged. In some embodiments, a material of the spacer is an organic material.

It is appreciated that a first polarizer may be provided on a surface of the first substrate 10 away from the second substrate 20, and a second polarizer may be provided on a surface of the second substrate 20 away from the first substrate 10. Adjustment of light can be realized through cooperation of the first polarizer and the second polarizer.

Figure 6:
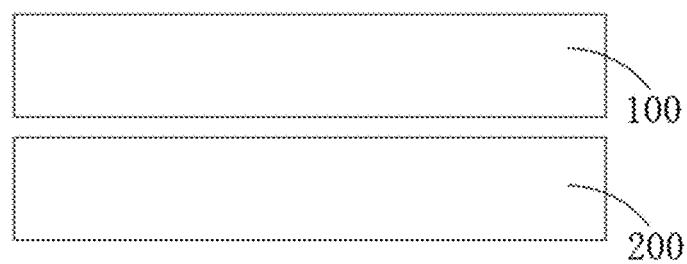
FIG. 6 is a schematic structural diagram of a display device provided by an embodiment of the present application.

Referring to FIG. 6, FIG. 6 is a schematic structural diagram of a display device provided by an embodiment of the present application. An embodiment of the present application may also provide a display device 900, including a liquid crystal display panel 100 and a backlight module 200. The backlight module 200 is disposed on a light incident side of the liquid crystal display panel 100. The liquid crystal display panel 100 may be the liquid crystal display panel 100 provided in any of the above-mentioned embodiments.

Exemplarily, the backlight module 200 may be a direct-lit backlight module or a side-lit backlight module.

The liquid crystal display panel and the display device provided by the embodiments of the present application have been described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A liquid crystal display panel, comprising:
   a first substrate;
   a second substrate disposed opposite to the first substrate; and
   a liquid crystal layer disposed between the first substrate and the second substrate;
   wherein the first substrate comprises a first base substrate, a TFT layer, a first passivation layer, a color photoresist layer, and a second passivation layer stacked in sequence;
   wherein the first substrate is defined with a display area and a test area defined at a periphery of the display area, and the color photoresist layer comprises a color filter layer disposed in the display area and a test color resist layer disposed in the test area; and
   wherein a second passivation layer and a protection film are sequentially stacked on a side of the test color resist layer away from the first substrate, the test color resist layer comprises a plurality of color resist blocks, and the protection film covers at least edge areas of top surfaces of the plurality of color resist blocks;
   wherein a width of each of the edge areas extending inward from an edge of one of the color resist blocks is 1/10 to 1/2 of a width of the one of the color resist blocks in a same direction.

2. The liquid crystal display panel according to claim 1, wherein the first substrate further comprises a pixel electrode layer, and the pixel electrode layer is disposed on a side of the second passivation layer away from the color photoresist layer; and
   wherein the pixel electrode layer comprises a pixel electrode disposed in the display area and the protection film disposed in the test area, and the pixel electrode is not connected to the protection film.

3. The liquid crystal display panel according to claim 1, wherein the protection film comprises a plurality of protection units; in the test color resist layer, a gap area between every two adjacent ones of the color resist blocks is provided with one of the protection units, and the protection unit covers the gap area between the two adjacent ones of the color resist blocks and covers the edge areas of the two adjacent ones of the color resist blocks respectively facing the gap area.

4. The liquid crystal display panel according to claim 1, wherein a material of the protection film comprises a transparent conductive metal oxide.

5. The liquid crystal display panel according to claim 4, wherein the transparent conductive metal oxide comprises indium tin oxide.

6. The liquid crystal display panel according to claim 1, wherein a material of the protection film comprises an organic polymer material.

7. The liquid crystal display panel according to claim 1, wherein the protection film has a thickness of 10 nm to 500 nm.

8. The liquid crystal display panel according to claim 1, wherein the protection film has a shape of a rectangle, an ellipse, a circle, or a rhombus.

9. The liquid crystal display panel according to claim 1, wherein an edge of the protection film is jagged or straight.

10. The liquid crystal display panel according to claim 1, wherein an extending direction of the protection film and an arrangement direction of the plurality of color resist blocks are perpendicular to each other.

11. The liquid crystal display panel according to claim 1, wherein an angle between an extending direction of the protection film and an arrangement direction of the plurality of color resist blocks is 45°, 60°, 70° or 80°.

12. The liquid crystal display panel according to claim 1, wherein a material of the first passivation layer comprises at least one of silicon nitride and silicon oxide, and a material of the second passivation layer comprises nitride comprises at least one of silicon and silicon oxide.

13. The liquid crystal display panel according to claim 1, wherein the second substrate comprises a second base substrate and a black matrix disposed on the second base substrate.

14. The liquid crystal display panel according to claim 13, wherein each of the first base substrate and the second base substrate is a light-transmitting substrate.

15. The liquid crystal display panel according to claim 14, wherein the first base substrate is a glass substrate or a plastic substrate, and the second base substrate is a glass substrate or a plastic substrate.

16. The liquid crystal display panel according to claim 1, wherein the liquid crystal display panel further comprises a sealant arranged between the first substrate and the second substrate and at a periphery of the liquid crystal layer.

17. The liquid crystal display panel according to claim 16, wherein each of the display area and the test area is disposed at an inner side of the sealant.

18. The liquid crystal display panel according to claim 1, wherein a plurality of spacers are disposed between the first substrate and the second substrate.

19. A display device, comprising a liquid crystal display panel according to claim 1 and a backlight module disposed on a light incident side of the liquid crystal display panel.

* * * * *